United States Patent
Sim et al.

(10) Patent No.: US 12,540,256 B2
(45) Date of Patent: Feb. 3, 2026

(54) CMP SLURRY COMPOSITION FOR POLISHING COPPER AND COPPER FILM POLISHING METHOD USING THE SAME

(71) Applicant: SAMSUNG SDI CO., LTD., Yongin-si (KR)

(72) Inventors: Soo Yeon Sim, Suwon-si (KR); Ji Ho Lee, Suwon-si (KR); Yong Goog Kim, Suwon-si (KR); Se Young Choi, Suwon-si (KR); Ja Young Hwang, Suwon-si (KR); Jeong Hee Kim, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 289 days.

(21) Appl. No.: 17/983,684

(22) Filed: Nov. 9, 2022

(65) Prior Publication Data

US 2023/0272242 A1    Aug. 31, 2023

(30) Foreign Application Priority Data

Jan. 28, 2022   (KR) .................. 10-2022-0013204

(51) Int. Cl.
*C09G 1/02* (2006.01)
*C23F 1/18* (2006.01)

(52) U.S. Cl.
CPC . *C09G 1/02* (2013.01); *C23F 1/18* (2013.01)

(58) Field of Classification Search
None
See application file for complete search history.

(56) References Cited

U.S. PATENT DOCUMENTS

| | | | |
|---|---|---|---|
| 2008/0090500 A1 | 4/2008 | Hellring et al. | |
| 2010/0178765 A1 | 7/2010 | Nomura et al. | |
| 2010/0301014 A1* | 12/2010 | Mizuno | C09K 3/1463 252/79.1 |
| 2012/0125374 A1 | 5/2012 | Preuschen et al. | |
| 2017/0166778 A1* | 6/2017 | Lauter | C09G 1/02 |
| 2020/0291267 A1 | 9/2020 | Lauter | |
| 2021/0115296 A1 | 4/2021 | Kim et al. | |

FOREIGN PATENT DOCUMENTS

| | | |
|---|---|---|
| CN | 101463227 A | 6/2009 |
| CN | 102690607 A | 9/2012 |
| CN | 108779367 A | 11/2018 |
| JP | 2009-088080 A | 4/2009 |
| JP | 2012-119697 A | 6/2012 |
| JP | 2012-182158 A | 9/2012 |
| JP | 2019-516238 A | 6/2019 |
| KR | 10-2005-0029726 A | 3/2005 |
| KR | 10-2016-0114709 A | 10/2016 |
| KR | 10-2018-0125961 A | 11/2018 |
| KR | 10-2019-0072236 A | 6/2019 |
| KR | 10-2021-0046497 A | 4/2021 |
| TW | 201506099 A | 2/2015 |

OTHER PUBLICATIONS

Office Action issued on Aug. 15, 2023, in the corresponding Taiwanese Patent Application No. 111143650.
Japanese Office Action issued on Dec. 11, 2023, in the corresponding Japanese Patent Application No. 2022-185107.
Chinese Office action dated Nov. 14, 2024.
Korean Office action dated Jan. 7, 2025.
Korean Notice of Allowance dated Sep. 17, 2025.

* cited by examiner

*Primary Examiner* — Allan W. Olsen
(74) *Attorney, Agent, or Firm* — Lee IP Law, P.C.

(57) ABSTRACT

A CMP slurry composition for polishing copper and a copper film polishing method using the same, the CMP slurry composition includes a solvent; an abrasive agent; and a compound including a structural unit represented by Formula 1 or a compound including a structural unit represented by Formula 2,

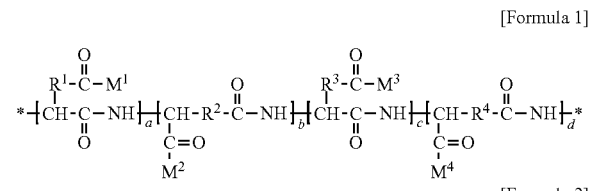

[Formula 1]

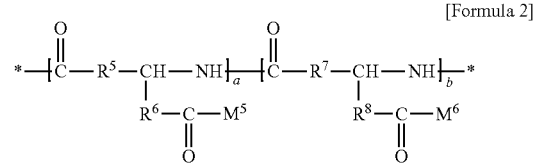

[Formula 2]

8 Claims, No Drawings

CMP SLURRY COMPOSITION FOR POLISHING COPPER AND COPPER FILM POLISHING METHOD USING THE SAME

CROSS-REFERENCE TO RELATED APPLICATION

This application claims the benefit of Korean Patent Application No. 10-2022-0013204, filed on Jan. 28, 2022, in the Korean Intellectual Property Office, the entire disclosure of which is incorporated herein by reference.

BACKGROUND

1. Field

Embodiments relate to a chemical mechanical polishing (CMP) slurry composition for polishing copper and a copper film polishing method using the same.

2. Description of the Related Art

A process of polishing a copper film, which is a metal interconnect of a semiconductor device, may achieve a sufficiently high polishing rate, good polishing selectivity to the copper film relative to a barrier metal or a dielectric, an appropriate level of flatness of a polished surface, and low defect levels.

SUMMARY

The embodiments may be realized by providing a chemical mechanical polishing (CMP) slurry composition for polishing copper, the CMP slurry composition including a solvent; an abrasive agent; and a compound including a structural unit represented by Formula 1 or a compound including a structural unit represented by Formula 2,

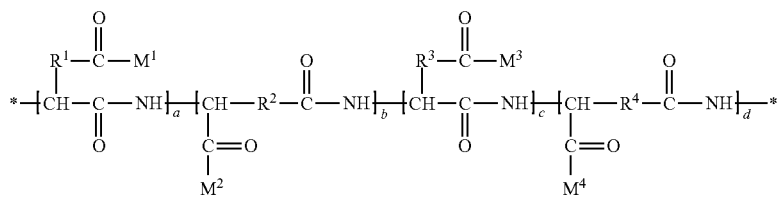

[Formula 1]

wherein, in Formula 1, * is a linking site, $R^1$, $R^2$, $R^3$, and $R^4$ are each independently a single bond or a $C_1$ to $C_5$ alkylene group, $M^1$, $M^2$, $M^3$ and $M^4$ are each independently OH or $O^-Z^+$, $Z^+$ being a monovalent cation, and a, b, c, and d are each independently greater than or equal to 0, and a+b+c+d is not equal to 0;

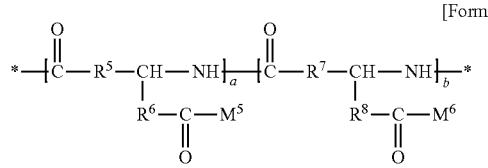

[Formula 2]

wherein, in Formula 2, * is a linking site, $R^5$, $R^6$, $R^7$, $R^8$ are each independently a $C_1$ to $C_5$ alkylene group, $M^5$ and $M^6$ are each independently OH or $O^-Z^+$, $Z^+$ being a monovalent cation, and a and b are each independently greater than or equal to 0, and a+b is not equal to 0.

The embodiments may be realized by providing a copper film polishing method comprising polishing a copper film using the CMP slurry composition according to an embodiment.

DETAILED DESCRIPTION

Example embodiments will now be described more fully hereinafter; however, they may be embodied in different forms and should not be construed as limited to the embodiments set forth herein. Rather, these embodiments are provided so that this disclosure will be thorough and complete, and will fully convey exemplary implementations to those skilled in the art.

It will also be understood that when a layer or element is referred to as being "on" another layer or element, it can be directly on the other layer or substrate, or intervening layers may also be present. In addition, it will also be understood that when a layer is referred to as being "between" two layers, it can be the only layer between the two layers, or one or more intervening layers may also be present. As used herein, the term "or" is not an exclusive term, e.g., "A or B" would include A, B, or A and B.

A CMP slurry composition for polishing copper according to an embodiment may include, e.g., a solvent (e.g., a polar solvent or a nonpolar solvent); an abrasive agent; and a compound including a structural unit represented by Formula 1 or a compound including a structural unit represented by Formula 2. In an implementation, the CMP slurry composition for polishing copper according to an embodiment may help improve flatness of a polished surface through reduction in surface defects, such as dishing and erosion, while achieving a high polishing rate with respect to a copper film.

In an implementation, the compound including a structural unit represented by Formula 1 or the compound including a structural unit represented by Formula 2 may be a dishing or erosion inhibitor in the CMP slurry composition for polishing copper. In an implementation, the compound including a structural unit represented by Formula 1 or the compound including a structural unit represented by Formula 2 may be present in an amount of, e.g., 50 wt % or more, 60 wt % or more, 70 wt % or more, 80 wt % or more, or 90 wt % or more, or 100 wt %, based on the total weight of all dishing or erosion inhibitors contained in the CMP slurry composition for polishing copper.

Now, each of the components of the CMP slurry composition for polishing copper according to an embodiment (hereinafter also referred to as a "CMP slurry composition") will be described in more detail.

The CMP slurry composition may include, e.g., a compound including a structural unit represented by Formula 1 or a compound including a structural unit represented by Formula 2.

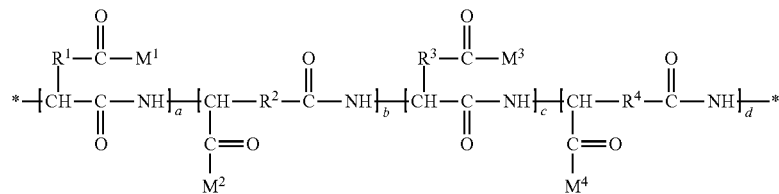

[Formula 1]

In Formula 1, * is a linking site (e.g., of elements)

$R^1$, $R^2$, $R^3$, and $R^4$ may each independently be or include, e.g., a single bond or a $C_1$ to $C_5$ alkylene group.

$M^1$, $M^2$, $M^3$ and $M^4$ may each independently be, e.g., OH or $O^-Z^+$ ($Z^+$ being a monovalent cation).

a, b, c, and d may each independently be, e.g., greater than or equal to 0.

a+b+c+d is not equal to 0.

[Formula 2]

In Formula 2, * is a linking site (e.g., of elements.

$R^5$, $R^6$, $R^7$ and $R^8$ may each independently be or include, e.g., a $C_1$ to $C_5$ alkylene group.

$M^5$ and $M^6$ may each independently be, e.g., OH or $O^-Z^+$ ($Z^+$ being a monovalent cation).

a and b may each independently be, e.g., greater than or equal to 0.

a+b is not equal to 0.

The compound including a structural unit represented by Formula 1 and the compound including a structural unit represented by Formula 2 may include, e.g., —C(=O)M$^1$, —C(=O)M$^2$, —C(=O)M$^3$, —C(=O)M$^4$, or —C(=O)M$^5$ ($M^1$, $M^2$, $M^3$, $M^4$, and $M^5$ being each independently OH or $O^-Z^+$ ($Z^+$ being a monovalent cation)), which is an electronegative group, while having a planar rigid amide group (—C(=O)—NH—) or a similar group to the amide group in a main chain thereof. Thus, each of the compound including a structural unit represented by Formula 1 and the compound including a structural unit represented by Formula 2 may help shield a copper film over a wide surface area thereof and thus may have high adsorption capacity with respect to the copper film, thereby ensuring significant reduction in dishing and erosion of the copper film. In an implementation, —C(=O)M$^1$, —C(=O)M$^2$, —C(=O)M$^3$, —C(=O)M$^4$, or —C(=O)M$^5$, which forms a side chain of each of the compound including a structural unit represented by Formula 1 and the compound including a structural unit represented by Formula 2, may be ionized into —C(=O)—O$^-$ in the CMP slurry composition and thus may have high adsorption capacity with respect to a copper film.

In an implementation, the compound including a structural unit represented by Formula 1 may have both —C(=O)M as a side chain and an amide group (—C(=O)—NH—) as a main chain in one repeat or structural unit. Accordingly, as compared with an acrylic acid and acrylamide copolymer, which has both a repeat unit having a carboxylic acid in a side chain thereof and a repeat unit having an amide group in a side chain thereof, the compound including a structural unit represented by Formula 1 may have a relatively small weight average molecular weight while exhibiting equivalent dishing or erosion inhibition properties. Accordingly, it is possible to help prevent or minimize reduction in polishing rate with respect to a copper film by reducing viscosity of the compound including a structural unit represented by Formula 1.

In Formula 1 and Formula 2, the monovalent cation may be a monovalent cation of an alkali metal (e.g., Li$^+$, Na$^+$, K$^+$).

In an implementation, in Formula 1 and Formula 2, the $C_1$ to $C_8$ alkylene group may be a $C_2$ to $C_3$ alkylene group, e.g., an ethylene group, a propylene group, a butylene group, or a pentylene group.

The compound including a structural unit represented by Formula 1 and the compound including a structural unit represented by Formula 2 may be, e.g., a homo-oligomer or a hetero-oligomer. As used herein, "oligomer" may refer to a compound having a weight average molecular weight of 1,000 g/mol to 5,000 g/mol, e.g., 1,000 g/mol, 1,100 g/mol, 1,200 g/mol, 1,300 g/mol, 1,400 g/mol, 1,500 g/mol, 1,600 g/mol, 1,700 g/mol, 1,800 g/mol, 1,900 g/mol, 2,000 g/mol, 2,100 g/mol, 2,200 g/mol, 2,300 g/mol, 2,400 g/mol, 2,500 g/mol, 2,600 g/mol, 2,700 g/mol, 2,800 g/mol, 2,900 g/mol, 3,000 g/mol, 3,100 g/mol, 3,200 g/mol, 3,300 g/mol, 3,400 g/mol, 3,500 g/mol, 3,600 g/mol, 3,700 g/mol, 3,800 g/mol, 3,900 g/mol, 4,000 g/mol, 4,100 g/mol, 4,200 g/mol, 4,300 g/mol, 4,400 g/mol, 4,500 g/mol, 4,600 g/mol, 4,700 g/mol, 4,800 g/mol, 4,900 g/mol, or 5,000 g/mol. Here, the weight average molecular weight may be measured by a suitable method. In an implementation, the weight average molecular weight may be determined by gel permeation chromatography (GPC) using a polystyrene standard sample.

In an implementation, the compound including a structural unit represented by Formula 1 may include, e.g., a compound including a structural unit represented by Formula 3, a compound including a structural unit represented by Formula 4, or a compound including a structural unit represented by Formula 5.

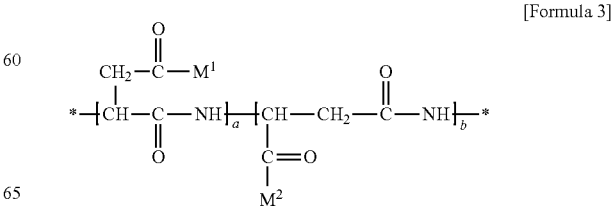

[Formula 3]

In Formula 3, * is a linking site.

$M^1$ and $M^2$ may be defined the same as those of Formula 1.

a and b may each independently be, e.g., greater than or equal to 0, and a+b is not equal to 0.

[Formula 4]

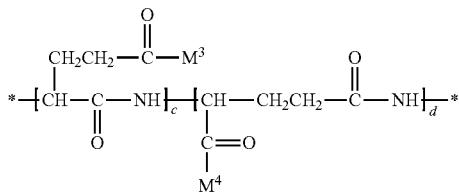

In Formula 4, * is a linking site.

$M^3$ and $M^4$ may be defined the same as those of Formula 1.

c and d may each independently be, e.g., greater than or equal to 0, and c+d is not equal to 0.

[Formula 5]

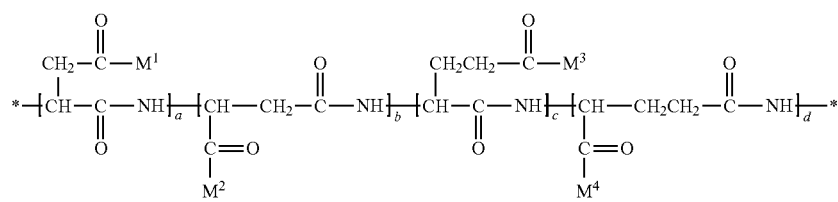

In Formula 5, * is a linking site.

$M^1$, $M^2$, $M^3$, and $M^4$ may be defined the same as those of Formula 1.

a, b, c, and d may each independently be, e.g., greater than or equal to 0, and a+b+c+d is not equal to 0.

In Formula 1 and Formula 5, a may range from, e.g., 0 to 30, b may range from, e.g., 0 to 30, c may range from, e.g., 0 to 30, and d may range from, e.g., 0 to 30. In an implementation, a, b, c, and d may each independently be, e.g., 0, greater than 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30. In Formula 1 and Formula 5, the order of arrangement of the repeat or structural units may be changed (e.g., the units may not necessarily be included in the order illustrated in the Formulae).

In Formula 2, Formula 3, and Formula 4, a may range from, e.g., 0 to 30 and b may range from, e.g., 0 to 30. In an implementation, a and b may be, e.g., 0, greater than 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30.

In an implementation, the compound including a structural unit represented by Formula 1 or the compound including a structural unit represented by Formula 2 may be present in an amount of, e.g., 0.0001 wt % to 2 wt %, 0.001 wt %, 0.005 wt %, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.5 wt %, 1 wt %, 1.5 wt %, or 2 wt %, 0.0002 wt % to 1 wt %, 0.0005 wt % to 0.5 wt %, or 0.001 wt % to 0.1 wt %, in the CMP slurry composition (e.g., based on a total weight of the CMP slurry composition). Within these ranges, the CMP slurry composition may help polish a copper film at a sufficiently high polishing rate and may help improve flatness of a polished surface through prevention of dishing and erosion.

The compound including a structural unit represented by Formula 1 or the compound including a structural unit represented by Formula 2 may be prepared by polymerization of a mixture of monomers including compounds providing the structural units in Formula 1 or compounds providing the structural units in Formula 2, or may be a commercially available product. In an implementation, the monomers may include an anionic amino acid, e.g., aspartic acid or glutamic acid. In an implementation, polymerization of the monomer mixture may be carried out by a suitable method. The weight average molecular weight of compound may be controlled through regulation of the amount of the monomers, polymerization time, or polymerization temperature, and the amount of a polymerization catalyst.

The solvent (e.g., the polar solvent or the nonpolar solvent) may help reduce friction between the abrasive agent and a copper film upon polishing the copper film using the abrasive agent. In an implementation, the solvent may include, e.g., water (e.g., ultrapure water), organic amines, organic alcohols, organic alcohol amines, organic ethers, or organic ketones. In an implementation, the solvent may include, e.g., ultrapure water or deionized water. The solvent may be present in a balance amount, e.g., in an amount of 20 wt % to 90 wt %, in the CMP slurry composition.

The abrasive agent may include a suitable abrasive agent for the polishing of copper. The abrasive agent may include, e.g., metal or non-metal oxide abrasive particles. In an implementation, the abrasive agent may include, e.g., silica, alumina, ceria, titania, or zirconia. In an implementation, the abrasive agent may include silica (e.g., colloidal silica).

The abrasive agent may be spherical or aspherical particles, and may have an average primary particle diameter ($D_{50}$) of 10 nm to 150 nm, e.g., 20 nm to 70 nm. Within these ranges, the abrasive agent may help polish a copper film, which is a polishing target herein, at a sufficiently high polishing rate without causing scratches. As used herein, "average particle diameter ($D_{50}$)" is a typical particle diameter measure and refers to a particle diameter corresponding to 50% by volume in a volume cumulative distribution of abrasive particles.

The abrasive agent may be present in an amount of, e.g., 0.001 wt % to 20 wt %, 0.005 wt % to 10 wt %, 0.01 wt % to 5 wt %, or 0.05 wt % to 3 wt %, in the CMP slurry composition. Within these ranges, the abrasive agent may help polish a copper film at a sufficiently high polishing rate without causing scratches and may aid in improving dispersion stability of the CMP slurry composition.

In an implementation, the CMP slurry composition may further include, e.g., a corrosion inhibitor, a chelating agent, or an oxidant.

The corrosion inhibitor may help protect a copper film in a trench of a polishing target including an oxide film and the copper film and may facilitate polishing of a patterned portion of the polishing target. The corrosion inhibitor may include, e.g., an azole compound. In an implementation, the azole compound may include, e.g., a triazole compound or a tetrazole compound.

The triazole compound may include, e.g., benzotriazole compounds including methylbenzotriazole, such as 5-methylbenzotriazole and 4-methylbenzotriazole, ethylbenzotriazole, propylbenzotriazole, butylbenzotriazole, pentylbenzotriazole, or hexylbenzotriazole, 1,2,4-triazole, 1,2,3-triazole, or the like. The triazole compound may be present in an original form thereof or in the form of a salt thereof in the CMP slurry composition. In an implementation, the tetrazole compound may include, e.g., tetrazole, 5-aminotetrazole, 5-methyltetrazole, or 5-phenyltetrazole. The tetrazole compound may be present in an original form thereof or in the form of a salt thereof in the CMP slurry composition.

The corrosion inhibitor may be present in an amount of, e.g., 0.001 wt % to 5 wt %, or 0.005 wt % to 0.5 wt %, in the CMP slurry composition. Within these ranges, the corrosion inhibitor may help reduce dishing or erosion upon polishing a patterned portion of a polishing target, thereby improving flatness of a polished surface.

The chelating agent chelates copper oxide and copper ions produced upon polishing of a copper film. Thus, the chelating agent may help suppress re-adsorption of the copper oxide onto the copper film, which is a polishing target, may help improve a polishing rate with respect to the copper film, and may help reduce surface defects.

The chelating agent may include, e.g., an organic acid, a salt of an organic acid, an amino acid, a salt of an amino acid, alcohols, such as dihydric alcohol, trihydric alcohol, or polyhydric alcohol, an amine-containing compound, a phosphate, or a phosphate salt. In an implementation, the chelating agent may include, e.g., an amino acid. Herein, "organic acid" may refer to an acid that does not have an amino group ($—NH_2$), unlike the amino acid. When the amino acid is used as the chelating agent, the CMP slurry composition may polish a copper film at a higher polishing rate than when the organic acid or the salt thereof or the phosphate salt is used as the chelating agent.

The organic acid may include an organic carboxylic acid having one or more carboxylic acid groups. In an implementation, the organic acid may include, e.g., a saturated acid, such as glycolic acid, lactic acid, acetic acid, propionic acid, butyric acid, pentanoic acid, hexanoic acid, formic acid, salicylic acid, dimethylbutyric acid, octanoic acid, benzoic acid, oxalic acid, malonic acid, succinic acid, glutaric acid, adipic acid, or pimelic acid, maleic acid, fumaric acid, itaconic acid, phthalic acid, or citric acid. In an implementation, the salt of the organic acid may include ammonium citrate, ammonium acetate, or the like.

The amino acid may include, e.g., glycine, alanine, serine, asparagine, glutamic acid, proline, oxyproline, arginine, cystine, histidine, tyrosine, leucine, lysine, methionine, valine, isoleucine, threonine, tryptophan, or phenylalanine. In an implementation, glycine may be used as the amino acid. When glycine is used as the amino acid, it is possible to further improve a polishing rate with respect to a copper film.

The phosphate salt may include, e.g., triammonium phosphate, triammonium phosphate trihydrate, or the like.

The chelating agent may be present in an amount of, e.g., 0.01 wt % to 20 wt %, or 0.1 wt % to 10 wt %, in the CMP slurry composition. Within these ranges, the chelating agent may help improve a polishing rate with respect to a copper film, dispersion stability of the composition, and post-polishing surface properties of the copper film.

The oxidant may facilitate polishing of a copper film by oxidizing the copper film. In an implementation, the oxidant may help improve post-polishing surface roughness of a copper film by smoothing the surface of the copper film.

The oxidant may include, e.g., an inorganic per-compound, an organic per-compound, bromic acid or a salt thereof, nitric acid or a salt thereof, chloric acid or a salt thereof, chromic acid or a salt thereof, iodic acid or a salt thereof, iron or a salt thereof, copper or a salt thereof, a rare-earth metal oxide, a transition metal oxide, or potassium dichromate. Herein, "per-compound" refers to a compound containing at least one peroxide group ($—O—O—$) or containing an element in the highest oxidation state. In an implementation, the oxidant may be, e.g., a per-compound. In an implementation, the per-compound may include, e.g., hydrogen peroxide, potassium periodate, calcium persulfate, or potassium ferricyanide. In an implementation, the per-compound may be hydrogen peroxide.

The oxidant may be present in an amount of, e.g., 0.1 wt % to 5 wt %, or 0.5 wt % to 2 wt %, in the CMP slurry composition. Within these ranges, the CMP slurry composition may exhibit good polishing performance.

In an implementation, the CMP slurry composition may further include a pH regulator. The pH regulator may include, e.g., an organic base, such as sodium hydroxide, potassium hydroxide, ammonium hydroxide, sodium carbonate, or potassium carbonate. In an implementation, the pH regulator may include an inorganic acid, e.g., nitric acid, phosphoric acid, hydrochloric acid, or sulfuric acid. The pH regulator may be present in an amount of, e.g., 1 wt % or less in the CMP slurry composition.

In an implementation, the CMP slurry composition may further include a suitable additive, e.g., a surfactant, a dispersant, a modifier, or the like.

The CMP slurry composition may have a pH of, e.g., 5 to 9, or 6 to 8.

A copper film polishing method according to an embodiment may include, e.g., polishing a copper film using the CMP slurry composition described above.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

A CMP slurry composition was prepared by mixing 0.01 wt % of polyaspartic acid (a compound including a structural unit represented by Formula 3, in which $M^1$ and $M^2$ are each OH, and having a weight average molecular weight of about 4,000 g/mol) with 1 wt % of colloidal silica having an average particle diameter ($D_{50}$) of 50 nm (DVSZN-004, Nalco Chemicals) as an abrasive agent, 0.1 wt % of 1,2,3-triazole (liquid, JL Chem Co., Ltd.) as a corrosion inhibitor, 1.5 wt % of glycine (solid, JL Chem Co., Ltd.) as a chelating agent, and the balance of ultrapure water, based on the total weight of the CMP slurry composition. Then, the prepared CMP slurry composition was adjusted to a pH of 7 using a pH regulator (nitric acid or potassium hydroxide). Then, hydrogen peroxide (liquid, Dongwoo Fine-Chem Co., Ltd.)

as an oxidant was added in an amount of 1.0 wt % based on the total weight of the CMP slurry composition.

Example 2

A CMP slurry composition was prepared in the same manner as in Example 1 except that the amount of polyaspartic acid was changed to 0.005 wt %.

Example 3

A CMP slurry composition was prepared in the same manner as in Example 1 except that 0.01 wt % of polyglutamic acid (a compound including a structural unit represented by Formula 4, in which $M^3$ and $M^4$ are each OH, and having a weight average molecular weight of about 4,000 g/mol) was used instead of polyaspartic acid.

Example 4

A CMP slurry composition was prepared in the same manner as in Example 3 except that the amount of polyglutamic acid was changed to 0.005 wt %.

Example 5

A CMP slurry composition was prepared in the same manner as in Example 1 except that compound including a structural unit represented by Formula 5, in which $M^1$, $M^2$, $M^3$, and $M^4$ are each OH, $10<a<20$, $10<b<20$, $10<c<20$, and $10<d<20$, and having a weight average molecular weight of about 4,000 g/mol, was used instead of polyaspartic acid.

Comparative Example 1

A CMP slurry composition was prepared in the same manner as in Example 1 except that polyaspartic acid was omitted.

Comparative Example 2

A CMP slurry composition was prepared in the same manner as in Example 1 except that 0.005 wt % of an acrylic acid-acrylamide copolymer (weight average molecular weight: about 800,000 g/mol) was used instead of polyaspartic acid.

Each of the CMP slurry compositions prepared in the Examples and Comparative Examples was evaluated as to properties shown in Table 1. Results are shown in Table 1.
(1) Copper Polishing Rate (Unit: Å/30 Sec):
A blanket wafer (diameter: 300 mm) fabricated by laminating a copper film on a silicon oxide film was polished under the following conditions, followed by converting changes in sheet resistance before and after polishing into an etched thickness, thereby calculating a polishing rate.
Polishing instrument: Reflexion LK 300 mm (AMAT Co., Ltd.)
Polishing pad: VP6000 (NexPlanar Corporation)
Polishing time: Polishing time was varied depending on the polishing amount of the blanket wafer.
Slurry flow rate: 250 mL/min
Pressure: 2.2 psi
Measurement of polishing rate: A sheet resistance meter
(2) Dishing (unit: nm): A patterned copper wafer (MIT 754 patterned wafer (Ta BM), Advantech Corporation, diameter: 300 mm) was polished in the same manner as in (1), followed by measurement of the profile of a wafer pattern using an AFM (XE-300, Park Systems). Dishing was measured in a trench having a size of 100 μm×100 μm.

(3) Erosion (unit: nm): A patterned copper wafer was polished in the same manner as in (1), followed by measurement of the profile of a wafer pattern using an InSight CAP Compact Atomic Profiler (Bruker Co., Ltd.). Erosion was calculated based on a difference in height between a peri oxide film and a cell oxide film in a 9/1 μm patterned area of the polished wafer. Here, a scanning rate was set to 100 μm/sec and a scan length was set to 2 mm.

TABLE 1

| | Compound | | Copper polishing rate | Dishing | Erosion |
|---|---|---|---|---|---|
| | Kind | Content | | | |
| Example 1 | Polyaspartic acid | 0.01 | 2,954 | 100 | 21 |
| Example 2 | Polyaspartic acid | 0.005 | 3,180 | 126 | 35 |
| Example 3 | Polyglutamic acid | 0.01 | 2,650 | 117 | 22 |
| Example 4 | Polyglutamic acid | 0.005 | 2,896 | 144 | 34 |
| Example 5 | Formula 5 | 0.01 | 3,051 | 87 | 12 |
| Comparative Example 1 | — | — | 3,300 | 277 | 183 |
| Comparative Example 2 | Acrylic acid-acrylamide copolymer | 0.005 | 2,200 | 220 | 140 |

As shown in Table 1, the CMP slurry composition according to the Examples exhibited improved flatness of a polished surface through reduction in surface defects, such as dishing and erosion, while exhibiting no reduction in polishing rate with respect to a copper film.

Conversely, the CMP slurry composition of Comparative Example 1, free from the compound including a structural unit represented by Formula 1 and the compound including a structural unit represented by Formula 2, caused significant dishing and erosion defects. In addition, the CMP slurry composition of Comparative Example 2, in which 0.005 wt % of the acrylic acid-acrylamide copolymer was used instead of the compound including a structural unit represented by Formula 1 and the compound including a structural unit represented by Formula 2, exhibited significant reduction in polishing rate and caused significant dishing and erosion defects. In addition, although not shown in Table 1, the copolymer was not easy to remove during cleaning after polishing due to a large weight average molecular weight thereof, causing organic defects.

By way of summation and review, with a reduction in thickness of an interconnect and semiconductor layers due to pattern miniaturization, a CMP slurry may be capable of ensuring high flatness of a polished surface.

Recently, in the field of CMP of copper films, development of dishing inhibitors is being actively conducted. As a solution to minimize dishing, an acrylic acid-acrylamide copolymer may be used. However, the acrylic acid-acrylamide copolymer could cause reduction in polishing rate with respect to a copper film and could cause organic defects after polishing.

One or more embodiments may provide a CMP slurry composition for polishing copper, which may achieve high flatness of a polished surface through reduction in surface defects such as dishing and erosion.

One or more embodiments may provide a CMP slurry composition for polishing copper, which exhibits no reduction in polishing rate with respect to a copper film.

One or more embodiments may provide a CMP slurry composition for polishing copper, which may help improve flatness of a polished surface through reduction in dishing and erosion while minimizing reduction in polishing rate with respect to a copper film.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A chemical mechanical polishing (CMP) slurry composition for polishing copper, the CMP slurry composition comprising:
   a solvent;
   an abrasive agent; and
   a compound including a structural unit represented by Formula 1 or a compound including a structural unit represented by Formula 2,

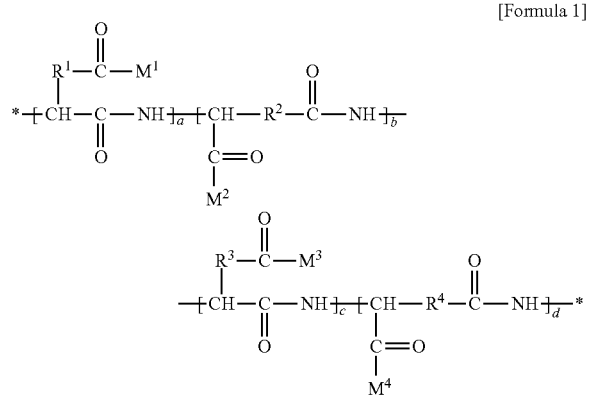

[Formula 1]

wherein, in Formula 1,
* is a linking site,
$R^1$, $R^2$, $R^3$, and $R^4$ are each independently a single bond or a $C_1$ to $C_5$ alkylene group,
$M^1$, $M^2$, $M^3$, and $M^4$ are each independently OH or $O^-Z^+$, $Z^+$ being a monovalent cation, and
a, b, c, and d are each independently 0 to 30, and a+b+c+d is not equal to 0;

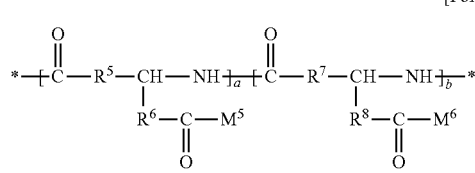

[Formula 2]

wherein, in Formula 2,
* is a linking site,
$R^5$, $R^6$, $R^7$, and $R^8$ are each independently a $C_1$ to $C_5$ alkylene group,
$M^5$ and $M^6$ are each independently OH or $O^-Z^+$, $Z^+$ being a monovalent cation, and
a and b are each independently 0 to 30, and a+b is not equal to 0,
wherein the compound including a structural unit represented by Formula 1 or the compound including a structural unit represented by Formula 2 has a weight average molecular weight of 1,000 g/mol to 5,000 g/mol,
wherein the CMP slurry composition includes:
0.001 wt % to 20 wt % of the abrasive agent, wherein the abrasive agent is silica,
0.0001 wt % to 2 wt % of the compound including a structural unit represented by Formula 1 or the compound including a structural unit represented by Formula 2,
0.001 wt % to 5 wt % of a corrosion inhibitor, wherein the corrosion inhibitor is a triazole compound,
0.01 wt % to 20 wt % of a chelating agent,
0.1 wt % to 5 wt % of an oxidant, and
a balance of the solvent, all wt % being based on a total weight of the CMP slurry composition.

2. The CMP slurry composition as claimed in claim 1, wherein:
   the CMP slurry composition includes the compound including a structural unit represented by Formula 1,
   the compound including a structural unit represented by Formula 1 includes a compound including a structural unit represented by Formula 3, a compound including a structural unit represented by Formula 4, or a compound including a structural unit represented by Formula 5,

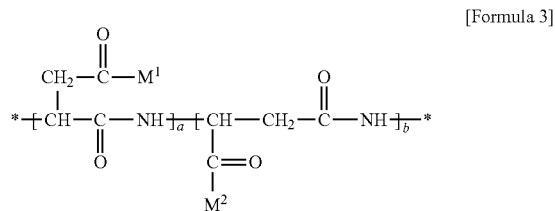

[Formula 3]

in Formula 3,
* is a linking site,
$M^1$ and $M^2$ are defined the same as those of Formula 1, and
a and b are each independently 0 to 30, and a+b is not equal to 0;

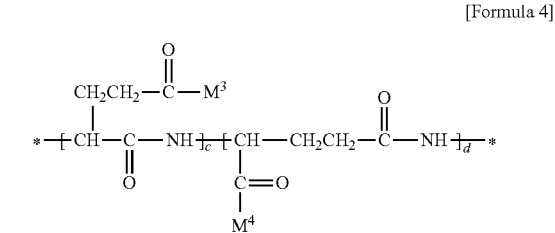

[Formula 4]

in Formula 4,
* is a linking site,
$M^3$ and $M^4$ are defined the same as those Formula 1, and
c and d are each independently 0 to 30, and c+d is not equal to 0;

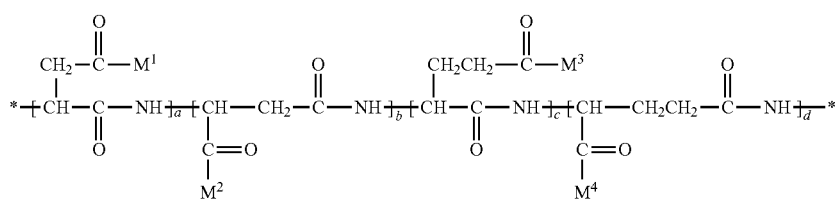

in Formula 5,

* is a linking site, $M^1$, $M^2$, $M^3$, and $M^4$ are defined the same as those of Formula 1, and a, b, c, and d are each independently 0 to 30, and a+b+c+d is not equal to 0.

3. The CMP slurry composition as claimed in claim 1, wherein:

the CMP slurry composition includes the compound including a structural unit represented by Formula 1, and in Formula 1, a ranges from 0 to 30, b ranges from 0 to 30, c ranges from 0 to 30, and d ranges from 0 to 30.

4. The CMP slurry composition as claimed in claim 1, wherein the CMP slurry composition has a pH of 5 to 9.

5. A copper film polishing method comprising polishing a copper film using the CMP slurry composition as claimed in claim 1.

6. The copper film polishing method as claimed in claim 5, wherein:

the CMP slurry composition includes the compound including a structural unit represented by Formula 1, the compound including a structural unit represented by Formula 1 includes a compound including a structural unit represented by Formula 3, a compound including a structural unit represented by Formula 4, or a compound including a structural unit represented by Formula 5,

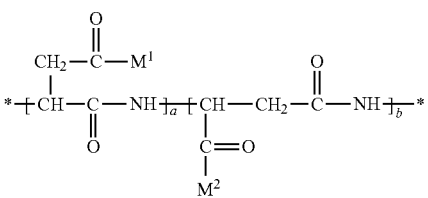

in Formula 3,

* is a linking site, $M^1$ and $M^2$ are defined the same as those of Formula 1, a and b are each independently 0 to 30 and a+b is not equal to 0;

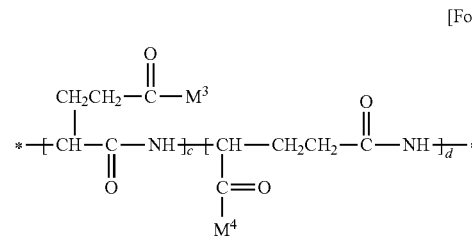

in Formula 4,

* is a linking site, $M^3$ and $M^4$ are defined the same as those Formula 1, c and d are each independently 0 to 30, and c+d is not equal to 0;

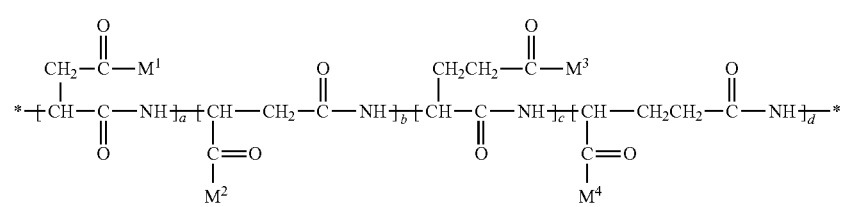

in Formula 5,

* is a linking site, $M^1$, $M^2$, $M^3$, and $M^4$ are defined the same as those of Formula 1, a, b, c, and d are each independently 0 to 30, and a+b+c+d is not equal to 0.

7. The copper film polishing method as claimed in claim 5, wherein:

the CMP slurry composition includes the compound including a structural unit represented by Formula 1, in Formula 1, a ranges from 0 to 30, b ranges from 0 to 30, c ranges from 0 to 30, and d ranges from 0 to 30.

8. The copper film polishing method as claimed in claim 5, wherein the CMP slurry composition has a pH of 5 to 9.

* * * * *